United States Patent [19]

Friedman et al.

[11] Patent Number: 4,903,770

[45] Date of Patent: Feb. 27, 1990

[54] SAND CONSOLIDATION METHODS

[75] Inventors: Robert H. Friedman; Billy W. Surles, both of Houston; Philip D. Fader, Katy, all of Tex.

[73] Assignee: Texaco Inc., White Plains, N.Y.

[21] Appl. No.: 357,571

[22] Filed: May 30, 1989

Related U.S. Application Data

[63] Continuation-in-part of Ser. No. 239,373, Sep. 1, 1988, abandoned.

[51] Int. Cl.$^4$ .................. E21B 43/24; E21B 33/138
[52] U.S. Cl. .................................. 166/288; 166/294; 166/295; 166/300
[58] Field of Search ............... 166/272, 288, 294, 295, 166/300, 303; 523/130, 131

[56] References Cited

U.S. PATENT DOCUMENTS

| | | | |
|---|---|---|---|
| 3,373,812 | 3/1968 | Smith et al. | 166/288 |
| 3,645,336 | 2/1972 | Young et al. | 166/288 |
| 4,073,343 | 2/1978 | Harnsberger | 166/295 |
| 4,250,963 | 2/1981 | Hess | 166/288 |
| 4,427,069 | 1/1984 | Friedman | 166/295 |
| 4,665,986 | 5/1987 | Sandiford | 166/288 |
| 4,669,543 | 6/1987 | Young | 166/292 X |

*Primary Examiner*—George A. Suchfield
*Attorney, Agent, or Firm*—Jack H. Park; Kenneth R. Priem

[57] ABSTRACT

Methods are provided for selectively consolidating naturally occurring mineral grains such as sand within a subterranean formation to form a fluid permeable barrier which restrains the movement of sand particles when oil passes through the barrier. A fluid comprising a polymerizable monomer such as furfural alcohol and as a diluent, a polar organic solvent such as methanol and a strong, non-volatile acid catalyst such as sulfuric acid is provided, mixed with steam to form a multiphase or aerosol treating fluid, and injected into the formation to be consolidated. An ester such as butyl acetate is incorporated in the fluid when the steam quality is less than 80 percent. The well is shut in for sufficient period of time for polymerization to convert the injected fluids into a permeable barrier around the wellbore.

29 Claims, No Drawings

SAND CONSOLIDATION METHODS

This application is a continuation-in part of application Ser. No. 07/239,373 filed Sept. 1, 1968 for Sand Consolidation Methods now abandoned.

REFERENCE TO COPENDING APPLICATIONS

This application is related to Pending Application Ser. No. 07/135162 filed Dec. 18, 1987 for CONSOLIDATABLE GRAVEL PACK METHOD, now U.S. Pat. No. 4,800,960 issued Jan. 31, 1989 and to pending application Ser. No. 07/223,822 filed Jul. 25, 1988 for SAND CONSOLIDATION METHODS now U.S. Pat. No. 4,842,072, issued June 27, 1989.

FIELD OF THE INVENTION

This invention concerns methods for treating wells completed in subterranean formations containing unconsolidated particulate matter, e.g. unconsolidated sand, which bind the unconsolidated sand grains together in the portions of the formation immediately adjacent to the perforations of the well, in order to form a stable yet still fluid permeable barrier around the wellbore, which permits production of fluids from the formation while restraining the movement of sand into the wellbore during the fluid production phase. More particularly, this invention pertains to an inexpensive method for accomplishing said consolidation in producing oil wells utilizing the said naturally present in the formation which utilizes a substantially reduced number of procedural steps. The method reduces the time and cost of treating wells, and produces a consolidated permeable sand-polymer matrix which reduces movement of said during oil production for up to several years, but which is more easily removed during workover operations than consolidated sand produced by prior art methods. Still more particularly, this invention comprises a method for selectively consolidating sand grains together in the formation adjacent to the inlet of a producing wellbore by use of a multiphase fluid comprising steam containing a polymerizable monomer with the catalyst already mixed with the resin in order to achieve more uniform mixing and to reduce the number of steps in prior art methods including first cleaning the sand grains, followed by contacting the sand with sufficient catalyst-containing fluid to deposit catalyst on the sand grain surface, prior to injecting the polymerizable resin.

BACKGROUND OF THE INVENTION

Sand consolidation is a well known term applying to procedures routinely practiced in the commercial production of petroleum, whereby wells are treated in order to reduce a problem generally referred to as unconsolidated sand production. When wells are completed in petroleum-containing formations which formations also contain unconsolidated granular mineral material such as sand or gravel, production of fluids from the formation causes the flow of the particulate matter into the wellbore, which often leads to any of several difficult and expensive problems. Sometimes a well is said to "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well. All of these problems are known to exist and many methods have been disclosed in the prior art and applied in oil fields in order to reduce or eliminate production of unconsolidated sand from a petroleum formation during the course of oil production.

The above-described problem and potential solutions to the problem have been the subject of extensive research by the petroleum industry in the hope of developing techniques which minimize or eliminate the movement of sand particles into the producing well and associated equipment during the course of producing fluids from the formation. One such general approach suggested in the prior art involves treating the porous, unconsolidated mass sand around the wellbore in order to cement the loose sand grains together, thereby forming a permeable consolidated sand mass which will allow production of fluids but which will restrain the movement of sand particles into the wellbore. The objective of such procedures is to create a permeable barrier or sieve adjacent to the perforations or other openings in the well casing which establish communication between the production formation and the production tubing, which restrains the flow of loose particulate mineral matter such as sand. Another approach involves removing a portion of the formation around the well and packing specially prepared resin-coated granular material into the formation around the wellbore which is subsequently caused to be cemented together.

It is a primary objective of any operable sand consolidation method that a barrier be formed around the wellbore which restrains the movement of sand particles into the well while offering little or no restriction to the flow of fluids, particularly oil, from the formation into the wellbore where it can be pumped to the surface of the earth.

Another very important quality of a satisfactory sand consolidation method is durability of the permeable barrier formed around the wellbore. Once the barrier is formed and the well is placed on production, there will be a substantial continuing flow of fluids through the flow channels within the permeable barrier, and it is important that the barrier last for a significant period of time, e.g. several months and preferably years, without excessive abrasive wear or other deterioration of the consolidation matrix which would cause the particulate matter to once again flow into the wellbore. This is a particularly difficult objective to accomplish in the instance of sand consolidation procedures applied to wells completed in formations subjected to steam flooding or other thermal recovery methods. The production of fluids in steam flooding operations involve higher temperatures and higher pH fluids than are normally encountered in ordinary primary production, and this greatly aggravates the stability problem of sand consolidation procedures.

An antithetical problem has developed in some of the modern sand consolidation processes. After a year or more of oil production, plugging of the consolidated sand mass filter often occurs and it then becomes necessary to workover the well, removing the plugged consolidated sand mass and then forming a new sand consolidating mass in its place. Some resin-consolidated sand filters are so durable that removal of the consolidated sand mass during workover is costly and time-consuming. Accordingly, there is an unfulfilled need for sand consolidation methods which are durable for a reasonable period of time, in the order of one or two years of production, but which are easy and inexpensive to remove when it becomes necessary to work over the well. Ideally, there is a need for sand consolidation methods which restrain the movement of sand during production for a year or more, but which are then more likely to disintegrate than to become plugged.

It is also important that the material injected into the formation should be essentially unreactive during the period it is inside the wellbore, i.e. while it is being pumped down the well and positioned where it is desired adjacent to the perforations of the production casing. It is this desire to delay the consolidation reaction that has lead to multi-step procedures in which first a catalyst is injected into the formation, after which the polymerizable resin-containing fluid is injected separately. While this reduces the propensity for the fluid to polymerize in the injection string, it does give rise to several problems which constitute inherent weaknesses in many prior art methods for accomplishing sand consolidation. First, each separate injection step increases the time and cost associated with the well treatment by which sand consolidation is accomplished. Second, injection of catalyst into the formation in advance of the polymerizable fluid does not accomplish uniform mixing of catalyst with all of the subsequently-injected polymerizable fluid to the degree necessary to ensure optimum polymerization of the resin, and thus often fails to achieve maximum, uniform strength and durability of the consolidated mass. Use of aqueous fluids to inject catalyst often gives rise to the need for yet additional preliminary steps to clean the sand to remove formation petroleum so the catalyst will be absorbed by the sand and later mix with the subsequently injected resin containing fluid.

Many materials have been utilized for consolidating sand in the formation adjacent to production of wellbores. One of the more successful agents utilized for this purpose are resins comprising oligomers of furfural alcohol which can be polymerized in situ to form a solid matrix which binds the sand grains together, while at the same time offering superior resistance to high temperatures and to caustic substances which may be encountered in steam flood operations. One of the problems in utilizing furfural alcohol oligomers to polymerize in the formation for the purpose of consolidating sand grains is failing to achieve uniform catalysis of the polymerization. Many catalysts that are effective for polymerizing furfural alcohol resins cannot be admixed with the furfural alcohol to permit a single fluid containing both the resin and the catalyst to be injected into the formation, because the time of polymerization is so short or unpredictable that there is excessive danger that the resin will polymerize in the injection wellbore. In my U.S. Pat. No. 4,427,069 there is disclosed a procedure for consolidating sand in a formation adjacent to a wellbore using an oligomer of furfural alcohol, in which the catalyst used is a water soluble acidic salt, preferably zirconyl chloride, which is injected in an aqueous solution into the formation prior to the resin containing fluid injection. The salt absorbs on the sand grains, and sufficient acidic salt remains adsorbed on the sand grain during the subsequent resin fluid injection stage that adequate polymerization occurs. Although this has been very effective in most difficult situations where sand consolidation procedures are utilized, particularly in connection with thermal flooding such as steam injection procedures, the procedure nevertheless requires a multi-fluid injection procedure which requires more time and is more expensive than is desired. Usually a preliminary sand cleaning step is required before injecting the aqueous-catalyst solution in order to remove the naturally-occurring oil film from the sand grains to ensure good catalyst adsorption on the sand. Also, although catalyst mixes with the subsequently injected polymer to a limited degree, usually sufficient to cause polymerization, it is believed that superior performance would result if the catalyst resin mixture can be made more homogenous prior to polymerization, in order to achieve a dense strong durable consolidation mass.

In U.S. Pat. No. 4,669,543 which issued June 2, 1987, there is described a method for consolidating sand using an acid curable resin and utilizing as a catalyst, the reaction product of an acid and an alkyl metal or ammonium molybdate. In that instance, the catalyst is incorporated in an aqueous carrier fluid which comprises the continuous phase of an emulsion in which the polymerizable resin is the dispersed or discontinuous phase. Thus this process requires that the emulsion be resolved or broken after it is located in the portion of the formation where the permeable consolidating mass is desired, which is difficult to achieve to the degree of completion and accuracy of timing necessary to accomplish the desired strong durable consolidating matrix necessary for a long lasting sand consolidation process.

In our copending application Ser. No. 07/223,822 we disclosed sand consolidation methods using an oligomer of furfural alcohol, a hydrolyzable ester as combination diluent and water extractor, and an oil soluble acid catalyst. While this produces a durable, temperature resistant permeable consolidated sand sieve, it has sometimes been difficult to remove during workover.

In view of the foregoing review of the current state of the art, it can be appreciated that there is still a substantial unfulfilled need for sand consolidation processes employing a polymerizable material in which complete mixing between the catalyst and the resin is accomplished prior to the polymerization reaction, in order to ensure that the polymerization reaction proceeds to completion, thus ensuring that the resultant polymer matrix posses the maximum possible strength and durability for the desired time period, but which either self destructs after a period of time or which is easily removed during workover. There is also a need for a sand consolidation process in which the number of separate fluid injection stages is reduced to a minimum of one or two, in order to reduce the time and cost of the sand consolidation method.

SUMMARY OF THE INVENTION

We have discovered novel methods for consolidating sand involving the use of a single fluid comprising steam, polymerizable monomer, preferably furfural alcohol, an organic diluent such as a low carbon alcohol and a non-volatile acid catalyst which can safely be mixed with the steam on the surface so a single, multiple phase fluid containing steam, catalyst and the monomer is injected into the unconsolidated sand. In certain applications, when the steam quality is below about seventy (70) percent, an ester such as butyl acetate is also included in the fluid. It is desired that catalyst action be sufficiently slow at ordinary surface ambient temperatures that there is no danger of premature reaction of the resin resulting in plugging of the surface mixing equipment or the injection string utilized for pumping the polymerizable monomer down the well into the formation. The catalyst activity is highly dependent on fluid pH, temperature, and monomer concentration. At fluid temperature as low as 194.F, with catalyst incorporated in the treating fluid, polymerization of the monomer will occur in a very short period of time. The preferred embodiment for use with steam quality in the range of 50 to 100% comprises preparing a treating fluid containing steam and a mixture comprising from 20 to 30 percent polymerizable monomer, preferably furfural alcohol, from 80 to 70 percent of a diluent, preferably a low carbon alcohol such as methanol, and sufficient non-volatile, strong acid such as sulfuric acid to produce a fluid comprising the furfural alcohol, diluent and acid having an acid normality of from 0.10 to 1.0 and preferably 0.25 to 0.50. The normality of the acid is critical in controlling the reaction rate, control of which is essential to avoid polymerization of the monomer in the injection line, but still have polymerization occur in the formation near the wellbore. Lower acid content is used for deeper formation depth. When the steam to be employed with this consolidation fluid has a quality below about 80 percent, an ester such as butyl acetate should be incorporated in the fluid mixture.

The mixture of steam, monomer, diluent, ester (if appropriate) and acid is a multiphase mixture, similar to an aerosol. This mixture is injected into the formation without danger of premature polymerization. The injected mixture simultaneously removes and displaces undesired oil and other material coating the sand grains, and accomplishes a thorough coating of the sand grains with the monomer-catalyst mixture. It is not necessary to inject salt water or other fluids after injecting the treating fluid to maintain permeability, as the vapor phase of the injected fluid ensures residual permeability of the consolidated sand mass. The well is then shut in for a period of from 2 to 9 hours and preferably at least 6 hours. The preferred shut-in period is a function of the formation temperature. This one-step procedure results in the formation of a permeable, durable, consolidated sand mass around the perforations of the wellbore which restrains the movement of sand into the wellbore during production operations, while permitting relatively free flow of formation fluids, particularly formation petroleum, into the wellbore. The thickness of the permeable mass formed around the perforations of the production well casing is determined by the volume of the fluid comprising the polymerizing monomer and catalyst injected into the formation. Ordinarily it is sufficient for our purposes if the volume of polymerized sand is at least 12 inches in thickness measured from the production well perforations. If the thickness exceeds 18 inches, the barrier is still effective but is unnecessarily expensive and may be flow restricting. This procedure results in a permeable mass which is stronger than previous techniques because the catalyst is more completely dispersed and mixed in the resin prior to polymerization than is possible by injecting a fluid containing the catalyst either before or after the polymer injection phase, but not so strong that it is difficult to remove during workover operation due to the relatively thin coating of polymer on the sand grains. The procedure also requires less time to accomplish in the field and is less expensive, because the number of separate injection steps is reduced over other prior art methods.

DETAILED DESCRIPTION OF THE PREFERRED EMBODIMENTS

We have discovered, and this constitutes our invention, that it is possible to accomplish improved sand consolidation methods utilizing the sand naturally occurring in the formation in a process employing a single multiphase fluid injection step in which a mixture of steam, polymerizable monomer, a catalyst for the polymerization of the monomer, and a organic diluent, and in certain embodiments, an ester such as butyl acetate is injected into the formation to enter the void space in the portion of the formation adjacent to the production well. When the steam quality is at least 80, the use of ester is not essential. When the steam quality is below 70, the ester is essential to ensure adequate strength and completeness of the consolidation step.

The injection of steam and polymerization chemicals is roughly analogous to a spray painting operation applied to a wire screen, where the wires are coated but the holes remain open. This method accomplishes coating the formation granular material, e.g. the formation sand, with the mixture of polymerizable monomer and catalyst. Since the reactive components of the fluid injected into the formation in this step are organic and contains a diluent, and are at steam temperatures, the minor amounts of formation petroleum and other oil-base materials coating and contaminating the surface of the sand grains are effectively removed or dissolved, making a preliminary sand cleaning step unnecessary. It is a particular feature of this method that a preliminary wash step to remove materials coating the sand grains is not required. We have conducted laboratory tests, using formation sand containing crude oil, to which additional oil was deliberately added, and we still obtained successful consolidation by this method without any preliminary wash step.

The polymerizable monomer which we have found to be especially preferable for use in our sand consolidation reaction is furfural alcohol. Any monomer which will polymerize upon exposure to heat and contact with an acid catalyst can be used in this process; however, furfural alcohol ($C_4H_3OCH_2O$) is the particularly preferred polymerizable monomer. This material has the advantage of being relatively inexpensive and having the characteristic of autopolymerizing on exposure to acid catalyst, forming a thermal setting resin which cures to an insoluble mass that is highly resistant to chemical attack as well as to thermal degradation.

During the injecting step the mixture of steam, monomer, diluent and catalyst enters the formation as an aerosol with steam vapor comprising the gaseous phase and dispersed drops of monomer and acid comprising the dispersed phase. The multiphase mixture is at or near steam temperature, which is ordinarily greater than the formation temperature. Drops of monomer and acid condense on the sand grains, which join together to form a liquid coating on the sand grains having sufficient thickness to bind the sand grains together. Polymerization occurs quickly in this liquid film, the reaction rate being roughly first order with monomer concentration and pH. At 150° C. the polymerization occurs in a matter of seconds, while the mixture of monomer and acid are stable and unreactive at surface conditions of 30° C. for several days.

The furfural alcohol utilized in our process is so reactive to acid that it must be diluted with an appropriate solvent in order to permit it to be dispersed in the steam and injected into the formation without premature reaction. Presence of a diluent accomplishes relatively complete coating of the sand grains in the formation between the sand grains. Any inexpensive solvent for the furfural alcohol monomer would accomplish this objective. Accordingly, our preferred diluent for the furfural alcohol monomer is a low carbon alcohol, and our especially preferred solvent is methanol.

The ester employed in certain embodiments of the fluid and process of our invention is any acetate or rapidly reacting anhydride. Our preferred ester is butyl acetate. It is necessary for this procedure that the acid catalyst utilized be non-volatile so that it remains in the fluid phase of the multiphase treating fluid. This permits thorough mixing of the catalyst with the polymerizable monomer which is essential in or order to ensure that the polymerization reaction occurs uniformly throughout the entire mass of sand contacted by the polymerizable monomer. Prior art methods which utilize a catalyst injected in a non-miscible fluid either before or after injection of the fluid containing the polymerizable resin, or present in a non-miscible phase of the polymer fluid, do not accomplish uniform reactions such as are possible by use of the present soluble catalyst. It is not necessary in our invention that once the fluid is placed in the formation, it be left in a quiescent state for a long period of time sufficient to ensure temperature equalization with the formation, as is required in most prior art methods. The polymerization reaction occurs very rapidly and is completed in a relatively brief period of time, so the well can be put on production in a matter of hours.

Our methods are preferably accomplished using the following materials and procedures. Our invention is especially successful when applied to formations containing unconsolidated sand and heavy oil which ordinarily requires steam stimulation to achieve commercial oil recovery rates. Such formations are typically relatively shallow, e.g. seldom deeper than 2,000 feet. If it is desired to apply the methods of our invention to deeper formations, some modifications to the injection procedures may be required to avoid polymerization in the injection line.

It is necessary that a source of steam be available at or near the well. The quality of steam is not critical to our process, and from 50 to 100 percent steam may be used. The quality of steam must be known, however, since the ester must be incorporated in the consolidating fluid whenever the steam quality is below about 80 percent. The concentration of ester in the polymer fluid is from 5 to 30 and preferably 20 to 30 percent by volume.

A consolidating fluid is provided on the surface near the well. This fluid is liquid phase and comprises from 10 to 50 and preferably from 20 to 30 percent by volume of a polymerizable monomer. Furfuryl alcohol is our especially preferred polymerizable monomer because it is inexpensive, readily available, non-toxic, easily auto polymerized by acid, and forms a strong, durable polymer which withstands hostile conditions in a producing well including those associated with steam stimulation.

A diluent is used with furfural alcohol to reduce the reaction rate on contact with acid. Directly mixing furfural alcohol with acid can produce high reaction rates or even an explosion. Any polar organic diluent may be used, but low molecular weight alcohol is the preferred diluent and methanol is our especially preferred material. Non-polar solvents must not be used since uncontrolled reaction rates including explosions result. The consolidating fluid should contain from 90 to 50 and preferably from 80 to 70 percent by volume polar organic diluent. If an ester is used in the fluid because of low steam quality, the volume of solvent is reduced.

The acid used to catalyze the polymerization of the monomer should be non-volatile strong acid. Sulfuric acid and trichloroacetic acid are the preferred acids. The concentration of acid in the treating fluid is very critical, since the acid concentration determines the reaction rate of the polymerization. Since the reactable monomer and acid are mixed with steam on the surface, the temperature of the fluid will be known, but not easily adjustable; therefore, the acid content of the treating fluid and the concentration of monomer are the primary means for controlling the polymerization rate. It is desired that essentially little or no reaction occur in the injection string before the fluid enters the formation. Since the depth and temperature of the formation are well known and the fluid injection rate is controllable or known, it is possible to adjust the acid content of the treating fluid so polymerization occurs precisely when desired, which is shortly after the fluid enters the formation.

The following is a guideline for adjusting acid content of the treating fluid for various formation temperatures in order to cause the polymerization to occur at the desired time.

TABLE 1

Preferred Treating Fluid Acid Content for Various Temperatures

| Temperature (°F.) | Acid Content (Normality) | Time |
|---|---|---|
| 73 | 1 | 1.5 hr. |
| | .2 | 9 hr. |
| | .1 | 17 hr. |
| | .05 | 32 hr. |
| 194 | 1 | 45 sec. |
| | .2 | 4 min. |
| | .1 | 8 min. |
| | .05 | 14 min. |
| 300 | 1 | 6 sec. |
| | .2 | 30 sec. |
| | .1 | 60 sec. |
| | .05 | 2 min. |

Ordinarily, this fluid is injected relatively fast when to 3 inch diameter line in the wellbore carrying treating fluid and steam where the steam generator delivers steam having quality values of from 50 to 80 percent at a pressure of from 250 to 350 pounds per square inch. Under these conditions the transit time in the injection string will be from 10 to 60 seconds.

In applying our methods, the consolidating fluid described above is mixed with steam on the surface, with the mixture passing through an injection string and into the formation where consolidation is desired. The consolidating fluid is mixed with steam in a volume ratio in the range of one part consolidating fluid to from 0.2 to 1 and preferably 0.4 to 0.6 parts by volume steam.

The mixture of consolidating fluid and steam forms a two-phase mixture, ideally an aerosol, and enters the formation in that form. The treating fluid droplets coalesce on the sand grains, forming a liquid coating on the said particles. Since the dispersed drops of liquid in the aerosol treating fluid include the polymerizable monomer and the acid, the liquid film formed on the sand surface comprises both monomer and acid. As the film forms, the polymerization of monomer begins due to contact with acid and proceeds very rapidly. The vapor portion of steam maintains the void spaces between monomer-coated sand grains open, which insures that the consolidated sand mass will have sufficient permeability to allow oil flow there through later, after the coating has cured and oil production has been resumed.

The quantity of the consolidating fluid comprising the polymerizable monomer, diluent and catalyst injected into the formation varies depending on the thickness and porosity of the formation to which the sand consolidation process is to be applied, as well as the diameter of the well and the desired thickness of the permeable barrier in the formation. The thickness and porosity of the formation and the diameter of the well will always be known, and it is ordinarily satisfactory if depth of the penetration is in the range of from 6 to 12 inches from the well bore.

Since this process does not require completely filling the void space of the portion of the formation being treated with consolidating fluid, the required volume of consolidating fluid is from 10 to 30 percent of the pore space of portion of the formation being treated. As an example, if it is desired to treat a formation whose thickness is 18 feet and porosity is 35% to form a permeable barrier just outside the perforations of the wellbore which is 8 inches thick, and the well being treated is 10 inches in diameter, then the volume of fluid necessary is calculated according to the example below.

Volume in cubic feet equals

Volume in cubic feet equals $$\frac{\pi\left(\frac{10}{2}+8\right)^2 - \pi\left(\frac{10}{2}\right)^2}{144} \times (Ht.) \times (Porosity) \times$$

$$(0.20) = \frac{3.14(13)^2 - 3.14(5)^2}{144} \times 18 \times (.35) \times (0.20)$$

equals 3.985 cubic feet=29.6 gallons of the consolidating fluid comprising monomer, diluent and acid. Since the consolidating fluid is mixed with steam in the ratio of 4 to 1, the total volume of treating fluid is 120 gallons.

After the steam and consolidating fluid is injected, the well should be shut in and left to stand for a period of from 1 to 24 and preferably from 2 to 9 hours to permit completion of the polymerization.

There are situations different from these described above when it is desirable to form a strong, impermeable barrier around a wellbore, such as when excessive water flow is mixing with oil produced from an adjacent layer, or when steam override at the producing well in a steam drive project is encountered. These problems can be corrected by forming a barrier similar to that described above, except that the final barrier has no permeability or very low permeability to fluid flow. A strong, durable impermeable barrier can be provided by use of the steam and polymerizable monomer, diluent and acid injection step described above, by reducing the acidity of the fluid. The lower the acid normality, the slower the polymerization reaction, and the farther the fluid will travel away from the well before polymerization. A very small amount of brine or other fluid should be pumped down the well tubing to ensure that the monomer-containing fluid is removed therefrom, but the volume of fluid should be carefully controlled to ensure that none of the fluid enters the formation. The composition and quantity of the monomer fluid is precisely the same as is described above for sand consolidation use except for the lower acid content. The well should be shut in for from 2 to 9 hours to allow the monomer sufficient time to polymerize completely prior to resumption of oil production.

EXPERIMENTAL

The following laboratory tests were performed and the results are given below.

Our experiments were performed using a pipe section that measured approximately 1.5 inches in diameter and 6 inches in length. The cell was packed with Kern River Field formation sample. Kern River crude oil was then injected into the formation material to represent the situation that would be encountered in a freshly drilled portion of formation. A consolidating fluid comprising the furfural alcohol, methanol and catalyst as is described below was mixed with steam and injected into the cell. Approximately 0.1 liters of the monomer fluid was utilized in the treatment process and approximately 0.02 liters of saturated steam was utilized in each experience.

EXAMPLE 1

A mixture of 50% furfural alcohol in methanol with 0.05 N hydrochloric acid resulted in no consolidation.

EXAMPLE 2

The same 50% furfural alcohol in methanol with acidity of 0.25N HCl plugged the sand pack.

EXAMPLE 3

A run using 10% furfural alcohol and 0.25 N HCl resulted in sand coating, but no consolidation. Steam was injected for six hours after the consolidating fluid was injected.

EXAMPLE 4

A run similar to run 3 was conducted, except the cell was shut in for several hours without passing steam through the cell. The results were the same as in Example 3.

EXAMPLE 5

A run using 0.25 N $H_2SO_4$ plus 20% furfural alcohol injected over a period of 5 minutes using 300° F. steam resulted in consolidation of about 50% of the sand.

Subsequent tests indicated that the optimum consolidation of 100 percent of the sand occurred when the consolidating fluid contained from 23% to 27% furfural alcohol, with from 77 to 73 percent methanol and sufficient sulfuric acid to result in the fluid acidity being from 0.25 to 0.50 N.

A larger scale experimental cell having a volume of 18.0 liters was constructed to permit further testing under conditions much closer to actual field conditions. The cell was heated to controlled temperatures of 300° F. similar to subterranean formations. Oil saturated Kern formation sand was packed into the cell. A simulated one inch diameter well was provided in the center of the cell. A steam line was attached to the well to permit introducing 300° F. steam into the well. The steam line was equipped with valves and back pressure regulators to permit introducing the consolidating fluid into the line to permit mixing of fluid with steam. A sample comprising 500 ml. of fluid (30 percent furfural alcohol, 70 percent methanol and 0.5N sulfuric acid)

was mixed with steam and injected into the well in our cell. The volume ratio of steam to the furfural alcohol solution was about 1 to 4. The cell was maintained at 300° F. for 6 hours. After 6 hours, the vat was allowed to cool and the sand was carefully removed from the cell. A strong, permeable consolidated sand mass was present around the well, the average diameter of the mass being twelve (12.0) inches attached to the perforations in the well.

A second experiment using water-saturated Ottawa sand produced the same results.

Another series of laboratory experiments were conducted to verify the need for an ester in the fluid when steam quality was less than about 10 percent.

Simulations of sand consolidations were made in a reactor vessel containing 5 ft³ of sand. The well was represented by a perforated wellbore assembly of ¾" diameter. Steam of less than 10 percent quality was produced by introducing a water stream into the superheater steamline.

After the performated wellbore assembly was placed into the reactor, the reactor was packed with 20/40 Ottawa sand. The reaction was then heated to an internal temperature of 300° F.. After the reactor core temperature had reached 300° F., the poor quality steam was injected. One liter of the consolidating fluid, consisting of furfural alcohol (FA), methanol (MeOH), and sulfuric acid (H2SO4), (40:59:1), was then introduced into the steamline and carried down the perforated wellbore tubing. A total of 4 liters (or 4,000 ml) of liquid water and 600 mls of water as steam was injected during the chemical treatment. The reactor was shut off and allowed to cool over night. Upon inspection, a few small isolated pieces of consolidated sand were found.

The above experiment was repeated except, half the methanol in the consolidating fluid was replaced with butyl acetate. Upon inspection, a few small isolated pieces of consolidated sand were found at the top of the sand pack. Deeper within the sand pack, a large consolidated mass was found completely surrounding the perforation tubing.

A second experiment using water-saturated Ottawa sand produced the same results.

The sole difference between the two tests was the addition of butyl acetate. The postulated reason for the difference in quality of consolidation was the ester's ability to chemically react with and thereby remove the liquid water in the stream which appears to dilute the FA in the first case.

Field Tests

A series of field experiments were undertaken in a field in Bakersfield, California. The field contains very viscous oil and production is achieved only as a response to steam stimulation.

Test 1. The well was packed with 20/40 mesh Ottawa sand. The steam quality was increased to 85% with a separator and wa injected at a rate of 200 barrels C.W.E. The downhole temperature was 342° F. Twenty-five liters of 40% F.A., 29½% methyl alcohol, 29½ butyl acetate, 1% H2SO4, was injected. After chemical injection, the well was shut-in and within 45 minutes the temperature was 294° F. The 10¾" liner was pulled and cut open. The upper half of the pack was totally consolidated and the lower half had no chemical in it. It was subsequently found that a mechanical plug was present ½ way down the perforation tubing.

Test 2. The well was packed with boiled Kern River material. The steam quality was less than 70% with a rate of 400 C.W.E. The wellhead pressure was 100 psi with a temperature of 324° F. 10 Liters of chemical (same as 1) were injected. After 1 hour, the temperature had dropped to 260° F. Consolidation was evidenced adjacent to the perforation tubing up and down the entire length of the pack.

Test 3. The well was packed with a layer of Kern formation sand, a layer of Ottawa sand, and topped with another layer of Kern material. The steam quality was less than 70% and the sand was water saturated. 25 Liters of the chemical (same as 1) was injected into the steamline (400 C.W.E.). The initial temperature of 32° F. had cooled to 240° F. after one hour. Consolidation was found in all three layers, but heavily favored the Ottawa layer due to its much higher permeability.

For the purpose of complete disclosure, including what is now believed to be as the best mode for applying the process of our invention, the following pilot field example is supplied.

A producing well is completed in a subterranean petroleum containing formation, the formation being from 2,540 to 2,588 feet. Considerable sand production has been experienced in other wells completed in this formation in the past, and so it is contemplated that some treatment must be applied in order to permit oil production from this formation without experiencing the various problems of unconsolidated sand production. This particular well has not been used for oil production, and so little sand has been produced from the formation. It is known that the sand is coated with formation crude, but is otherwise of a reasonable particle size to accommodate sand consolidation process using the natural sand present in the formation. It is decided therefore to inject steam and the sand consolidation fluid into the formation immediately adjacent to the perforation of the producing well in order to bind the naturally occurring sand grains together and form a stable mass which forms a permeable barrier to restrain the flow of formation sand into the well while still permitting the free flow of formation fluids including petroleum through the barrier. It is determined that it is sufficient to treat approximately 12 inches into the formation. Based on experience in this field, it is expected that the porosity of the formation to be treated is approximately 40%. The outside casing diameter of the well being treated is ten inches. The volume of sand consolidating fluid necessary to treat this portion of formation is determined as follows:

$$\frac{3.14\left(\frac{10}{2} + 12\right)^2 - 3.14\left(\frac{10}{2}\right)^2}{144} \times (0.40)(48)(0.20) =$$

$$\frac{3.14(17)^2 - 3.14(5)^2}{144} \times (.40)(48)(0.20) =$$

22.12 Cu. Ft. or 165.5 gallons

In order to accomplish adequate contact of the portion of the unconsolidated sand formation adjacent to the production well, a total of 166 gallons of sand consolidating fluid is required. The required volume of sand consolidation treating fluid is formulated by mixing 45 gallons of furfural alcohol with 119.0 gallons of methanol to which had previously been added 2.0 gallons of sulfuric acid. The sand consolidation fluid is injected into a steam line at the wellhead in a ratio of 90 parts steam to 10 parts sand consolidating fluid. Steam temperature is 300° F. and the steam quality is 85 percent. This fluid is injected into the formation at a rate of about 1,440 gallons per hour. After all of the treating fluid has been injected into the formation, the well is shut in for 6 hours to ensure complete polymerization. At the conclusion of this shut-in period, the well is placed on production and essentially sand-free oil production is obtained.

Although our invention has been described in terms of a series of specific preferred embodiments and illustrative examples which applicants believe to include the best mode for applying their invention known to them at the time of this application, it will be recognized to those skilled in the art that various modifications may be made to the composition and methods described herein without departing from the true spirit and scope of our invention which is defined more precisely in the claims appended hereinafter below.

We claim:

1. A method for consolidating unconsolidated mineral particles including sand in a subterranean petroleum formation penetrated by a well in fluid communication with at least a portion of the formation, comprising:
   (a) providing a sand consolidating fluid comprising a polymerizable monomer, diluent for the monomer, and a non-volatile strong acid catalyst capable of causing polymerization of the monomer at fluid injection temperatures;
   (b) mixing the sand consolidating fluid with steam to form a multiphase treating fluid;
   (c) injecting said treating fluid into the formation to occupy the void space of at least a portion of the formation adjacent to the well; and
   (d) allowing the injected fluids to remain in the formations for a period of time sufficient to accomplish at least partial polymerization of the monomer, forming a permeable consolidated mass around the wellbore.

2. A method recited in claim 1 wherein the monomer is furfural alcohol.

3. A method as recited in claim 2 wherein the concentration of the furfural alcohol is from 10 to 50 percent by volume based on the total volume of the sand consolidating fluid.

4. A method as recited in claim 2 wherein the concentration of furfural alcohol is from 20 to 30 percent by volume based on the total volume of the sand consolidating fluid.

5. A method as recited in claim 1 wherein the diluent is a low molecular weight alcohol.

6. A method as recited in claim 5 wherein the diluent is methanol.

7. A method as recited in claim 5 wherein the concentration of alcohol in the sand consolidating fluid is from 90 to 50 percent by volume.

8. A method as recited in claim 5 wherein the concentration of alcohol in the sand consolidating fluid is from 80 to 70 percent by volume.

9. A method as recited in claim 1 wherein the catalyst is sulfuric acid.

10. A method as recited in claim 1 wherein the concentration of acid catalyst in the sand consolidating fluid is from 0.1 to 1.0 normal.

11. A method as recited in claim 1 wherein the concentration of acid catalyst in the sand consolidating fluid is from 0.25 to 0.5 normal.

12. A method as recited in claim 1 wherein the volume ratio of sand consolidating fluid to steam is from 0.2 to 1.

13. A method as recited in claim 1 wherein the volume of sand consolidating fluid is sufficient to substantially coat the sand grains in the portion of the formation adjacent to the producing well for a distance up to 12 inches from the well.

14. A method as recited in claim 1 wherein the acid content of the sand consolidating fluid is adjusted to cause polymerization to occur after a time slightly greater than the time required for the steam and sand consolidating fluid to be injected into the formation.

15. A method as recited in claim 1 wherein the fluids are left in the formation for a period of at least 6 hours.

16. A method as recited in claim 1 wherein the sand consolidating fluid also contains an ester.

17. A method as recited in claim 16 wherein the ester is butyl acetate.

18. A method as recited in claim 16 wherein the concentration of ester is from 20 to 30 volume percent.

19. A method as recited in claim 16 wherein the steam quality is below 80 percent and the ester concentration is from 20 to 30 percent.

20. A method as recited in claim 16 wherein the ester is butyl acetate.

21. A method as recited in claim 16 wherein the concentration of ester is from 20 to 30 volume percent.

22. A method as recited in claim 16 wherein the steam quality is below 80 percent and the ester concentration is from 20 to 30 percent.

23. A method as recited in claim 1 wherein the sand consolidating fluid also contains an ester.

24. A method for forming a fluid impermeable zone in a permeable, subterranean oil-containing formation adjacent to a wellbore penetrating said formation, comprising
   a. providing a fluid comprising a polymerizable monomer, a diluent for said monomer, and a strong acid catalyst which causes polymerization of the monomer at steam temperatures;
   b. forming a mixture of said fluid from step (a) with steam
   c. injecting said fluid mixture into the formation to saturate at least a portion of the formation; and
   d. allowing said fluid to remain in the formation for a period of time sufficient to accomplish at least partial polymerization of said monomer, forming a fluid impermeable barrier between the well and the formation.

25. A method as recited in claim 24 wherein said monomer is furfural alcohol.

26. A method as recited in claim 24 wherein said diluent is a low molecular weight alcohol.

27. A method as recited in claim 26 wherein said alcohol is methanol.

28. A method as recited in claim 24 wherein said acid is sulfuric acid.

29. A method as recited in claim 24 wherein the acid content of the fluid comprising monomer, diluent and catalyst is adjusted to cause the polymerization of monomer to occur after a time slightly greater than the time required for the fluid to be injected into the formation and be displaced to a desired location in the formation.

* * * * *